(12) United States Patent
Lee et al.

(10) Patent No.: US 9,310,458 B2
(45) Date of Patent: Apr. 12, 2016

(54) METHOD FOR CALCULATING SPACING RATIO OF INTERFEROMETER ARRAY ANTENNA FOR DIRECTION FINDER

(71) Applicants: Jung Hoon Lee, Daejeon (KR); Jeung Min Joo, Daejeon (KR)

(72) Inventors: Jung Hoon Lee, Daejeon (KR); Jeung Min Joo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 520 days.

(21) Appl. No.: 13/936,288

(22) Filed: Jul. 8, 2013

(65) Prior Publication Data

US 2014/0104111 A1      Apr. 17, 2014

(30) Foreign Application Priority Data

Oct. 16, 2012   (KR) ........................ 10-2012-0114951

(51) Int. Cl.
*G01S 3/48* (2006.01)
*G01S 3/46* (2006.01)

(52) U.S. Cl.
CPC .... *G01S 3/46* (2013.01); *G01S 3/48* (2013.01)

(58) Field of Classification Search
CPC ..................................... G01S 3/46; G01S 3/48
USPC ........................................................ 342/424
See application file for complete search history.

(56) References Cited

U.S. PATENT DOCUMENTS

| 6,489,923 | B1 * | 12/2002 | Bevan .................... G01S 1/026 342/378 |
| 2006/0082501 | A1 * | 4/2006 | Chiang .................... G01S 3/48 342/442 |
| 2006/0130555 | A1 * | 6/2006 | Workman .......... G01N 29/0618 73/1.82 |

OTHER PUBLICATIONS

Pace, 2001, IEEE High resolution phase sampled interferometry, vol. 9, No. 10, Oct. 2001, 1-2.*

* cited by examiner

*Primary Examiner* — Harry Liu
(74) *Attorney, Agent, or Firm* — Scully, Scott, Murphy & Presser, P.C.

(57) ABSTRACT

A method for calculating a spacing between antenna elements of an interferometer array antenna includes setting an azimuth of an instantaneous field of view and a distance between phase differences, and obtaining the number of phase difference lines and phase difference vectors with respect to the phase differences of the signals output in a phase comparator of a direction finder, performing a modular arithmetic for the phase difference vectors to obtain phase difference matrixes, obtaining a transformation matrix for linearly transforming the phase difference matrixes and performing the linear transformation using the transformation matrix, calculating a distance between the phase differences on a new axis generated by the linear transformation, and calculating an antenna spacing as an array spacing of the array antenna, the antenna spacing meeting that the distance between the phase differences is greater than a desired distance between phase differences.

11 Claims, 4 Drawing Sheets

METHOD FOR CALCULATING SPACING RATIO OF INTERFEROMETER ARRAY ANTENNA FOR DIRECTION FINDER

CROSS-REFERENCE TO RELATED APPLICATIONS

Pursuant to 35 U.S.C. §119(a), this application claims the benefit of earlier filing date and right of priority to Korean Application No. 10-2012-0114951, filed on Oct. 16, 2012 the contents of which is incorporated by reference herein in its entirety.

BACKGROUND OF THE INVENTION

1. Field of the Invention

This specification relates to a method for calculating a spacing ratio of an interferometer array antenna which finds a direction through phase comparison.

2. Background of the Invention

In general, a direction finder is a receiving apparatus which measures a direction that electric waves are coming, and also referred to as a radio direction finder. The direction finder does not emit electric waves (radio waves) unlike radar. The direction finder is used for safety of ships and aircrafts and for identifying or monitoring unidentified or unlawful radio waves.

The direction finder includes an antenna for receiving a radio wave and a receiver for processing the received radio wave. The antenna and the receiver of the direction finder have various structures and shapes according to a way of finding a direction.

Examples of various direction finding techniques include spinning direction finding, amplitude comparison direction finding, phase comparison direction finding which is so-called an interferometer, and the like.

The interferometry is a technique for finding a direction using a phase comparison method. This is a technique used for high-accuracy location of emitters operating at frequencies from just above direct current (DC) to well above light. The interferometer may include two matched antennas and two matched receivers. Radio waves (radio signals) which are received through antennas of two channels in the interferometer are converted into intermediate frequencies by the respective receivers so as to be passed to a phase comparator, which measures a relative phase angle according to directions that the two signals are arriving. The relative phase angle is then passed to a direction finding processor, namely, a processor, which then calculates an angle of arrival (AOA) of the radio waves relative to a baseline which is the orientation of the two antennas. In a general interferometric system, the processor accepts information relating to the orientation of the baseline (true north or true local horizontal), to determine the true azimuth or elevation angle to the emitter.

An interferometer array antenna according to the present disclosure is an antenna system having two or more antennas, and may determine an azimuth of a received signal by using a state phase difference which is measured between the antennas. Especially, in order to estimate an AOA of a radio signal source including elements of an electronic war field, such as early warning threat detection, tracking, and electronic information, phases of the radio signal sources are compared to measure an azimuth of the radio signal source. When an array spacing is acquired for obtaining high accuracy, a spacing between antennas is one of important factors for avoiding ambiguity and satisfying required accuracy of direction finding.

The antenna spacing may be acquired by a probability calculation which minimizes ambiguity in consideration of electrical phase errors due to a signal-to-noise ratio and errors due to electrical phase non-matching of elements, or by using disjoint sets to avoid a phase difference set output by the array antenna from being repetitively generated in an instantaneous field of view (IFOV).

The first method requires complicated processes and the second method is simple but has a disadvantage that phase difference shift which is generated in a direction finder is not considered.

Therefore, a method for obtaining (calculating) an array spacing of a is direction finder by making up for those methods is required.

SUMMARY OF THE INVENTION

Therefore, an aspect of the detailed description is to provide a method for calculating a spacing ratio of an interferometer array antenna which executes phase comparison direction finding.

To achieve these and other advantages and in accordance with the purpose of this specification, as embodied and broadly described herein, there is provided a method for calculating a spacing between antenna elements of an interferometer array antenna, the method including setting an azimuth of an instantaneous field of view (IFOV) and a distance between phase differences with respect to signals received via the array antenna, and obtaining the number of phase difference lines and phase difference vectors with respect to the phase differences of the signals output in a phase comparator of a direction finder, performing a modular arithmetic for the phase difference vectors to obtain phase difference matrixes, obtaining a transformation matrix for linearly transforming the phase difference matrixes and performing the linear transformation using the transformation matrix, calculating a distance between the phase differences on a new axis generated by the linear transformation, and calculating an antenna spacing as an array spacing of the array antenna, the antenna spacing meeting that the distance between the phase differences is greater than a desired distance between phase differences.

In accordance with one exemplary embodiment, two phase differences output from the phase comparator may be used when the array antenna uses a is three-element linear array, and three phase differences may be used when the array antenna uses a four-element linear array.

In accordance with one exemplary embodiment, $K_n$ may be calculated using Mathematical Equation $$K_n = \text{fix}\left\{\frac{d_n}{\lambda}\sin(\theta)\right\},$$

and the phase difference vector may be a multiple of $2\pi$.

In accordance with one exemplary embodiment, the azimuth of the IFOV may be set within $-\theta_{max} \leq \theta \leq \theta_{max}$.

In accordance with one exemplary embodiment, the modular arithmetic $(\cdot) \bmod 2\pi$ may be carried out in the three-element array when the IFOV is within $0^+ \leq \theta \leq \theta_{max}$ and the modular arithmetic $2\pi - (\cdot) \bmod 2\pi$ may be carried out in the four-element array when the IFOV is within $-\theta_{max} \leq \theta \leq 0^-$.

In accordance with one exemplary embodiment, the linear transformation may use Mathematical Equation $V = T\Phi$ in the three-element array.

In accordance with one exemplary embodiment, the transformation matrix may be $$T = \begin{bmatrix} \cos(\alpha) & -\sin(\alpha) \\ \sin(\alpha) & \cos(\alpha) \end{bmatrix},$$

where α may meet $\alpha = \tan^{-1}(d_1/d_2)$.

In accordance with one exemplary embodiment, the linear transformation may use $V = T_{\phi_2} T_{\phi_1} \Phi$ in the four-element array.

In accordance with one exemplary embodiment, the transformation matrix may be $$T_{\phi_1} = \begin{bmatrix} \cos(\alpha) & \sin(\alpha) & 0 \\ -\sin(\alpha) & \cos(\alpha) & 0 \\ 0 & 0 & 1 \end{bmatrix},$$

and $$T_{\phi_2} = \begin{bmatrix} 1 & 0 & 0 \\ 0 & \cos(\beta) & \sin(\beta) \\ 0 & -\sin(\beta) & \cos(\beta) \end{bmatrix},$$

where α and β may meet $\alpha = -\tan^{-1}(d_1/d_2)$, and $\beta = -\tan^{-1}(\sqrt{d_1^2 + d_2^2}/d_3)$, respectively.

In accordance with one exemplary embodiment, the distance between the phase differences may be obtained by using $$d_{i,j,l} = \sqrt{\sum_{k=1}^{l} (v_{ki} - v_{kj})^2},$$

$i, j = 1, 2, \ldots 2K,$ and $$K = \begin{cases} K_1 + K_2 + 1, & \text{if } l = 1 \\ K_1 + K_2 + K_3 + 1, & \text{if } l = 2 \end{cases}.$$

In accordance with one exemplary embodiment, Mathematical Equation $$\underset{\substack{i,j \\ i \neq j}}{\text{All }} d_{i,j,l} \geq R$$

may be used to meet that each distance between the phase differences is greater than a desired distance between phase differences.

A method for calculating a spacing ratio of an interferometer array antenna for a direction finder may facilitate for setting an antenna spacing of the array antenna in spite of system complexity or affection by a payload platform.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail of a method for calculating a spacing ratio of an interferometer array antenna for finding direction according to the exemplary embodiments, with reference to the accompanying drawings. Hereinafter, suffixes "module" and "unit or portion" for components used herein in description are merely provided only for facilitation of preparing this specification, and thus they are not granted a specific meaning or function. Hence, it should be noticed that "module" and "unit or portion" can be used together. For the sake of brief description with reference to the drawings, the same or equivalent components will be provided with the same reference numbers, and description thereof will not be repeated. The expression in the singular form in this specification will cover the expression in the plural form unless otherwise indicated obviously from the context.

The present disclosure is applied to a method for calculating a spacing of an interferometer array antenna which executes phase comparison direction finding.

Figure 1:
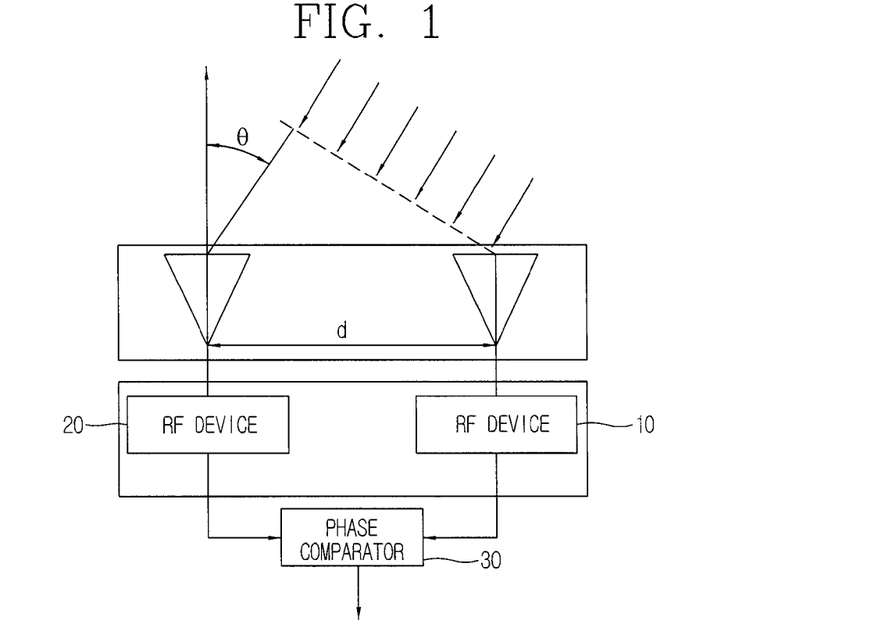
FIG. 1 is a view showing a configuration of a two-element interferometer direction finder.

A phase comparison direction finder may estimate orientations by comparing phase differences of radio signals received. FIG. 1 shows a general interferometer array antenna using two antennas. Signals received by antennas may be passed through RF components, such as RF elements 10 and 20, and a phase comparator 30 may output a phase difference between the two antennas. The output phase difference may be represented by Equation 1.

$$\varphi = \frac{2\pi}{\lambda} d\sin(\theta) \quad \text{[Equation 1]}$$

where $\lambda$ denotes a wave length, d denotes a spacing (distance) between the antennas, $\theta$ denotes an incident angle of a radio signal. Also, since a phase difference is repetitive by $\pm 2\pi$, the phase difference of a multi-interferometer having a plurality of antennas may be represented by Equation 2.

$$\Delta \varphi_n = \varphi_n - 2\pi K_n,$$
$$K_n = \text{fix}\left\{\frac{d_n}{\lambda}\sin(\theta)\right\} \quad \text{[Equation 2]}$$

where fix(x) denotes a value obtained by selecting an integer the closest to 0 between x and 0. An instantaneous field of view (IFOV) is limited to $|\theta| \leq \pi/2$. Also, an electrical phase angle $\Phi$ may be output by modular arithmetic (mod $2\pi$) in the phase comparator, and be represented by Equation 3.

$$\phi_n = \phi_n(\text{mod } 2\pi) \quad \text{[Equation 3]}$$

where n denotes an antenna spacing index. ψ denotes a phase is difference output after modular arithmetic (mod $2\pi$) in the phase comparator 30. In addition, each phase difference ratio in an interferometer linear array using n+1 antennas may be represented by Equation 4 based on Mathematical Equation 3.

$$\frac{\varphi_n}{\varphi_{n+1}} = \frac{d_n}{d_{n+1}} \quad \text{[Mathematical Equation 4]}$$

Figure 2A:
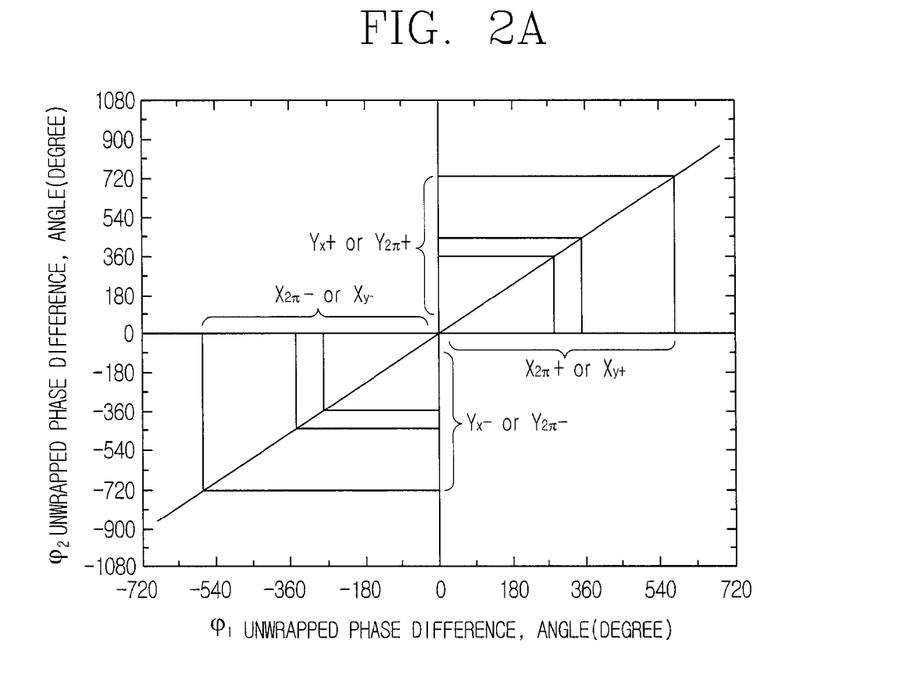
FIG. 2A is a view showing phase differences by two phase difference outputs in a three-element linear array (when not executing a modular conversion)

When the modular arithmetic is not carried out, a phase difference with respect to two phase differences output in a three-element linear array (an array antenna having three antenna elements) is shown in FIG. 2A.

Hereinafter, description will be given of a method of calculating a spacing ratio between antenna elements of an interferometer array antenna for a direction finder in accordance with an exemplary embodiment.

To calculate a spacing ratio of an interferometer array antenna, a modular integer and a phase difference vector of each phase difference output in a phase comparator 30 of the direction finder may be acquired (calculated) (S100). The modular integer of each phase difference may be acquired using Equation 2.

Figure 2B:
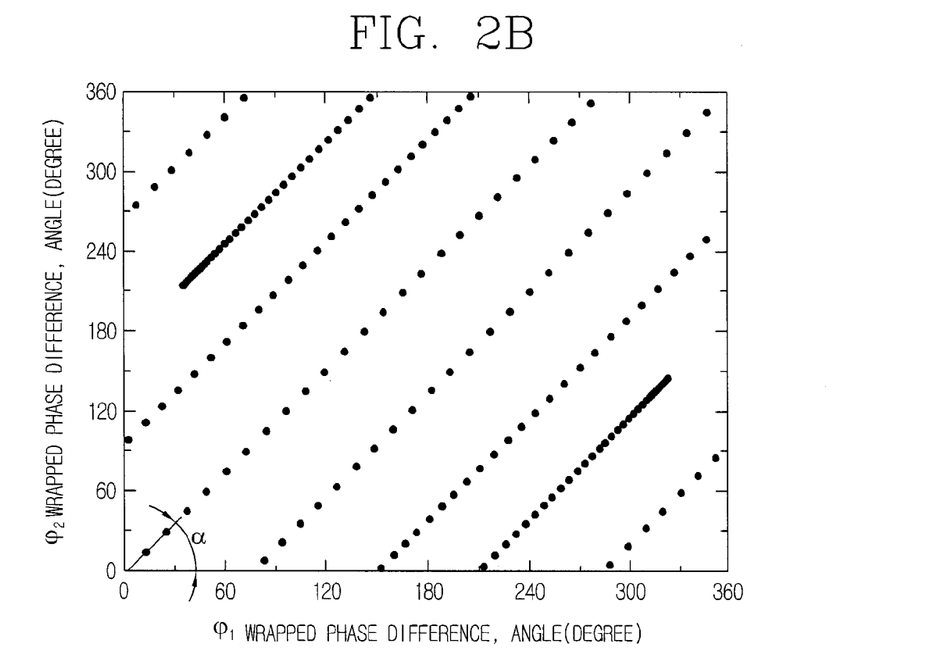
FIG. 2B is a view showing phase differences by two phase difference outputs in a three-element linear array (when executing a modular conversion)

FIG. 2B is a planar view showing phase differences obtained by carrying out 2πmodular arithmetic (modular transformation) with respect to phase differences $\phi_1$ and $\phi_2$. In FIG. 2A, since the phase difference $\phi_1$ or $\phi_2$ is output after carrying out the modular arithmetic, a phase difference line may be generated every time when the phase difference is a multiple of $\pm 2\pi$. Therefore, whenever the phase difference $\phi_1$ is the multiple of $\pm 2\pi$, the phase difference $\phi_2$ corresponding to it may be obtained by using Mathematical Equation 4. Also, whenever the phase difference $\phi_2$ becomes $\pm 2\pi$, the corresponding phase difference $\phi_1$ may be obtained by using Equation 4.

To calculate an array spacing without ambiguity, the lines generated after the modular arithmetic do not have to be overlapped and a distance between the lines has to satisfy a phase difference error which is required in DF. To this end, after sampling a phase difference per each phase difference line and transforming it into a new coordinate system, an array spacing may be obtained in the new coordinate system.

The number of lines generated by the phase differences may be obtained by Mathematical Equation 2. In Mathematical Equation 2, the integer for the phase difference $\phi_1$ may be $K_1$, and the integer for the phase difference $\phi_2$ may be $K_2$.

For obtaining phase difference data, the IFOV may be divided into two areas based on 0°, and 0 may be divided into $0^-$ and $0^+$.

Within an area $0^+ \leq \theta \leq \theta_{max}$ of the IFOV, the integers $K_1$ and $K_2$ corresponding to the phase differences $\phi_1$ and $\phi_2$ may be acquired from Mathematical Equation 2. In the maximum IFOV, the output phase differences may be $\phi_1 \geq 2\pi K_1$ and $\phi_2 \geq 2\pi K_2$, respectively. Therefore, the number of phase difference lines generated within the area may be $N = K_1 + K_2 + 1$. Also, in the area $-\theta_{max} \leq \theta \leq 0^-$, the number of lines is the same.

Therefore, the total number of phase difference lines generated in the area $-\theta_{max} \leq \theta \leq \theta_{max}$ of the IFOV may be 2N, and the number of phase difference data required is the same.

When Using Two Phase Difference Outputs in Three-Element Linear Array

Within an area $0^+ \leq \theta \leq \theta_{max}$ of the IFOV, the phase difference $\phi_1$ may repeat $2\pi$ by $K_1$ times. Hence, a phase difference vector including $0^+$ may be $X_{2\pi^+} = 2\pi[0^+, 1, \ldots, k_1]$, and a phase difference corresponding to the vector may be expressed as $Y_{x^+} = (d_2/d_1)X_{2\pi^+}$.

The phase difference $\phi_2$ may repeat $2\pi$ by $K_2$ times. Therefore, a phase difference vector may be $Y_{2\pi^+} = 2\pi[1, 2 \ldots, K_2]$, and a phase difference corresponding to the vector may be expressed as $X_{y^+} = (d_1/d_2)Y_{2\pi^+}$.

Within an area $-\theta_{max} \leq \theta \leq 0^-$ of the IFOV, the phase difference $\phi_1$ may repeat $-2\pi$ by $K_1$ times. Therefore, a phase difference vector including $0^-$ may be $X_{2\pi^-} = 2\pi[-K_1, \ldots, 0^-]$, and a phase difference corresponding to the vector may be $Y_{x^-} = (d_2/d_1)X_{2\pi^-}$.

The phase difference $\phi_2$ may repeat $-2\pi$ by $K_2$ times. Therefore, a phase difference vector may be $Y_{2\pi^-} = 2\pi[-K_2, \ldots, -1]$, and a phase difference corresponding to the vector may be expressed as $X_{y^-} = (d_1/d_2)Y_{2\pi^-}$.

When Using Three Phase Difference Outputs in Four-Element Linear Array

Within an area $0^+ \leq \theta \leq \theta_{max}$ of the IFOV, the phase difference $\phi_1$ may repeat $2\pi$ by $K_1$ times. A phase difference vector including $0^+$ may be $X_{2\pi^+} = 2\pi[0^+, 1, \ldots, K_1]$, and a phase difference corresponding to the vector may be expressed as $Y_{x^+} = (d_2/d_1)X_{2\pi^+}$ and $Z_{x^+} = (d_3/d_1)X_{2\pi^+}$.

The phase difference $\phi_2$ may repeat $2\pi$ by $K_2$ times. Therefore, a phase difference vector may be $Y_{2\pi^+} = 2\pi[1, 2 \ldots, K_2]$, and a phase difference corresponding to the vector may be expressed as $X_{y^+} = (d_1/d_2)Y_{2\pi^+}$ and $Z_{y^+} = (d_3/d_2)Y_{2\pi^+}$.

A phase difference $\phi_3$ may repeat $2\pi$ by $K_3$ times. Therefore, a phase difference vector may be $Z_{2\pi^+} = 2\pi[1, 2 \ldots, K_3]$, and a phase difference corresponding to the vector may be expressed as $Y_{z^+} = (d_2/d_3)Z_{2\pi^+}$ and $X_{z^+} = (d_1/d_3)Z_{2\pi^+}$.

Within the area $-\theta_{max} \leq \theta \leq 0^-$ of the IFOV, the phase difference $\phi_1$ may repeat $-2\pi$ by $K_1$ times. Therefore, a phase difference vector including $0^-$ may be $X_{2\pi^-} = 2\pi[-K_1, \ldots, 0^-]$, and a phase difference corresponding to the vector may be $Y_{x^-} = (d_2/d_1)X_{2\pi^-}$ and $Z_{x^-} = (d_3/d_1)X_{2\pi^-}$.

The phase difference $\phi_2$ may repeat $-2\pi$ by $K_2$ times. Therefore, a phase difference vector may be $Y_{2\pi^-} = 2\pi[-K_2, \ldots, -1]$, and a phase difference corresponding to the vector may be expressed as $X_{y^-} = (d_1/d_2)Y_{2\pi^-}$ and $Z_{y^-} = (d_3/d_2)Y_{2\pi^-}$.

The phase difference $\phi_3$ may repeat $-2\pi$ by $K_3$ times. Therefore, a phase difference vector may be $Z_{2\pi}^-=2\pi[-K_3,\ldots,-1]$, and a phase difference corresponding to the vector may be expressed as $Y_z^-=(d_2/d_3)Z_{2\pi}^-$ and $X_z^-=(d_1/d_3)Z_{2\pi}^-$.

Then, a modular arithmetic for each phase difference vector generated by an antenna spacing may be carried out (S200).

As shown in FIG. 1, the phase comparator 30 may carry out the $2\pi$ modular arithmetic to output a phase difference. That is, the phase comparator 30 may output an unwrapped phase difference shown in FIG. 2A into a wrapped phase difference shown in FIG. 2B. Therefore, a modular transformation may be carried out for the phase difference vectors, obtaining phase difference vectors.

For the phase difference vector using the three-element array, $(\cdot)$mod $2\pi$ may be carried out for each of the phase difference vectors $X_{2\pi}^+$, $X_{y}^+$, $Y_{2\pi}^+$ and $Y_{y}^+$, which have been obtained within the area $0^+\le\theta\le\theta_{max}$ of the IFOV, thereby obtaining wrapped phase difference vectors $X_{2\pi}^{+w}$, $X_{y}^{+w}$, $Y_{2\pi}^{+w}$ and $Y_{y}^{+w}$.

Since the phase differences obtained within the area $-\theta_{max}\le\theta\le0^-$ of the IFOV are generated reversely from the phase differences within the area $0^+\le\theta\le\theta_{max}$ of the IFOV, $2\pi-(\cdot)$mod $2\pi$ may be carried out for each of the phase difference vectors $X_{2\pi}^-$, $X_{y}^-$, $Y_{2\pi}^-$ and $Y_{y}^-$, thereby obtaining wrapped phase difference vectors $X_{2\pi}^{-w}$, $X_{y}^{-w}$, $Y_{2\pi}^{-w}$ and $Y_{y}^{-w}$.

For the phase difference vectors using the four-element array, $(\cdot)$mode $2\pi$ may be carried out for each of the phase difference vectors $X_{2\pi}^+$, $Y_{x}^+$, $Z_{x}^+$, $X_{y}^+$, $Y_{2\pi}^+$, $Z_{y}^+$, $X_{z}^+$, $Y_{z}^+$, $Z_{2\pi}^+$ which have been obtained within the area $0^+\le\theta\le\theta_{max}$ of the IFOV, thereby obtaining wrapped phase difference vectors $X_{2\pi}^{+w}$, $Y_{x}^{+w}$, $Z_{x}^{+w}$, $X_{y}^{+w}$, $Y_{2\pi}^{+w}$, $Z_{y}^{+w}$, $X_{z}^{+w}$, $Y_{z}^{+w}$, $Z_{2\pi}^{+w}$.

Since the phase differences obtained within the area $-\theta_{max}\le\theta\le0^-$ of the IFOV are generated reversely from the phase differences obtained within the area $0^+\le\theta\le\theta_{max}$ of the IFOV, $2\pi-(\cdot)$mod $2\pi$ may be carried out for each of $X_{2\pi}^-$, $Y_{x}^-$, $Z_{x}^-$, $X_{y}^-$, $Y_{2\pi}^-$, $Z_{y}^-$, $X_{z}^-$, $Y_{z}^-$, $Z_{2\pi}^-$, thereby obtaining wrapped phase difference vectors $X_{2\pi}^{-w}$, $Y_{x}^{-w}$, $Z_{x}^{-w}$, $X_{y}^{-w}$, $Y_{2\pi}^{-w}$, $Z_{y}^{-w}$, $X_{z}^{-w}$, $Y_{z}^{-w}$, $Z_{2\pi}^{-w}$.

The third step S210 may be a step of obtaining a phase difference matrix using the phase difference vectors.

For a three-element linear array X-axial and Y-axial wrapped phase difference vectors may be expressed in form of matrix for linear transformation, as shown in Mathematical Equation 5.

$$\Phi = \begin{bmatrix} X_{2\pi}^{-w} & X_{2\pi}^{+w} & X_{y^-}^{w} & X_{y^+}^{w} \\ Y_{x^-}^{w} & Y_{x^+}^{w} & Y_{2\pi}^{+w} & Y_{2\pi}^{-w} \end{bmatrix} \quad \text{[Mathematical Equation 5]}$$

For a four-element linear array, a phase difference matrix in addition to a Z-axial phase difference vector for linear transformation may be expressed as shown in Mathematical Equation 6.

$$\Phi = \begin{bmatrix} X_{2\pi}^{-w} & X_{2\pi}^{+w} & X_{y^-}^{w} & X_{y^+}^{w} & X_{z^-}^{w} & X_{z^+}^{w} \\ Y_{x^-}^{w} & Y_{x^+}^{w} & Y_{2\pi}^{-w} & Y_{2\pi}^{+w} & Y_{z^-}^{w} & Y_{z^+}^{w} \\ Z_{x^-}^{w} & Z_{x^+}^{w} & Z_{y^-}^{w} & Z_{y^+}^{w} & Z_{2\pi}^{-w} & Z_{2\pi}^{+w} \end{bmatrix} \quad \text{[Mathematical Equation 6]}$$

The fourth step S300 may be a step of obtaining a transformation matrix for linearly transforming each phase difference matrix.

Figure 2C:
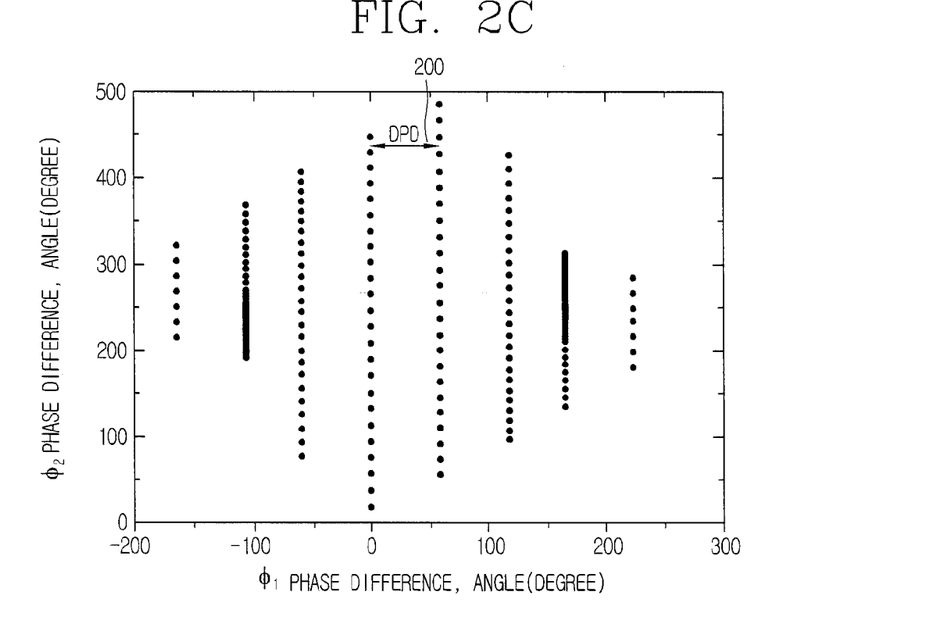
FIG. 2C is a view showing phase differences obtained by executing linear transformation for two phase difference outputs in a three-element linear array.

FIG. 2B shows a wrapped phase difference. Here, a gradient of a straight line which is generated by a phase difference is a. When rotation is carried out by the gradient in a counterclockwise direction, phase differences as shown in FIG. 2C may be obtained. Hence, rotation transformation for the phase difference matrix may be carried out by the gradient angle $\alpha$, and the transformed matrix may be represented by Mathematical Equation 7.

$$T = \begin{bmatrix} \cos(\alpha) & -\sin(\alpha) \\ \sin(\alpha) & \cos(\alpha) \end{bmatrix} \quad \text{[Mathematical Equation 7]}$$

where $\alpha=\tan^{-1}(d_1/d_2)$.

Figure 3A:
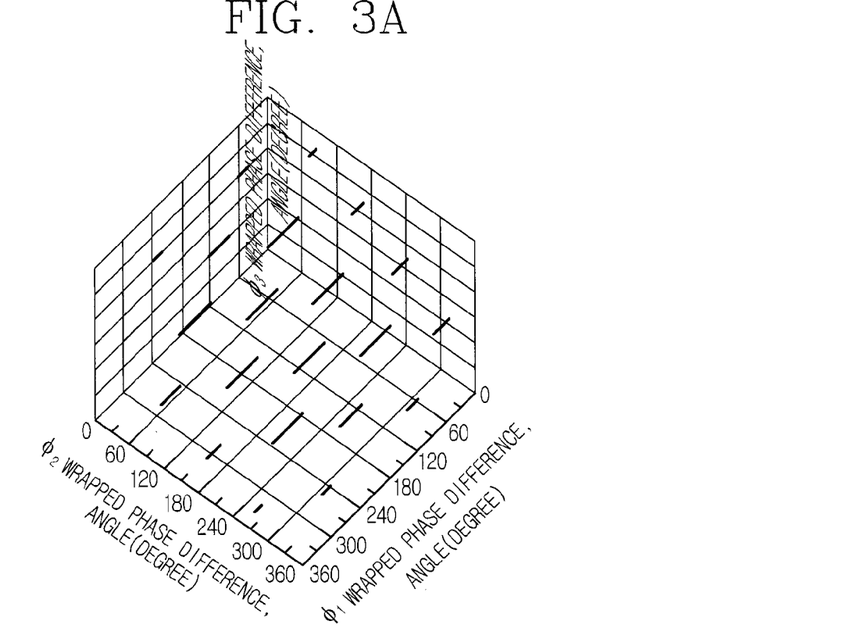
FIG. 3A is a view showing phase differences obtained by three phase difference outputs in a four-element linear array (when executing a modular conversion)

Also, in the four-element antenna array, in order to perform transformation of the phase difference line shown in FIG. 3A into a phase difference dot (point), an Euler angle may be used. $\alpha$ angle transformation may be carried out for the phase difference $\phi_1$ and $\beta$ angle transformation may be carried out for the phase difference $\phi_2$.

Here, a transformation matrix applied to the four-element array may be represented by Mathematical Equation 8.

$$T_{\phi_1} = \begin{bmatrix} \cos(\alpha) & \sin(\alpha) & 0 \\ -\sin(\alpha) & \cos(\alpha) & 0 \\ 0 & 0 & 1 \end{bmatrix} \quad \text{[Mathematical Equation 8]}$$

$$T_{\phi_2} = \begin{bmatrix} 1 & 0 & 0 \\ 0 & \cos(\beta) & \sin(\beta) \\ 0 & -\sin(\beta) & \cos(\beta) \end{bmatrix}$$

Here, $\alpha=-\tan^-(d_1/d_2)$, and $\beta=\tan^{-1}(\sqrt{d_1^2+d_2^2}/d_3)$.

The fifth step S400 may be a step of linearly transforming a phase difference matrix using a transformation matrix.

In the three-element antenna array, the phase difference matrix of Mathematical Equation 5 may be linearly transformed by the transformation matrix of Mathematical Equation 7, and this may be represented by Mathematical Equation 9.

$$V=T\cdot\Phi \quad \text{[Mathematical Equation 9]}$$

When axis transformation for the phase difference matrix sampled in the three-element antenna array is carried out, the phase difference lines, as shown in FIG. 2C, may be obtained. Elements of a matrix V may include phase differences generated in a new coordinate system. Since a horizontal axis indicates ambiguity and a vertical axis indicates phase difference resolution of the direction finder in FIG. 2C, it can be understood that a vector on the second column in the matrix V of Mathematical Equation 8 is not associated with ambiguity. Therefore, when a value more than a preset value is selected as a distance of the first column vector element on the matrix V, the interferometer direction finder using the three-element array may not have ambiguity generated.

In the four-element antenna array, the phase difference matrix of Mathematical Equation 6 may be linearly transformed by the transformation matrix of Mathematical Equation 8, and this may be represented by Mathematical Equation 10.

$$V = T_\phi T_\phi \Phi \quad \text{[Mathematical Equation 10]}$$

Figure 3B:
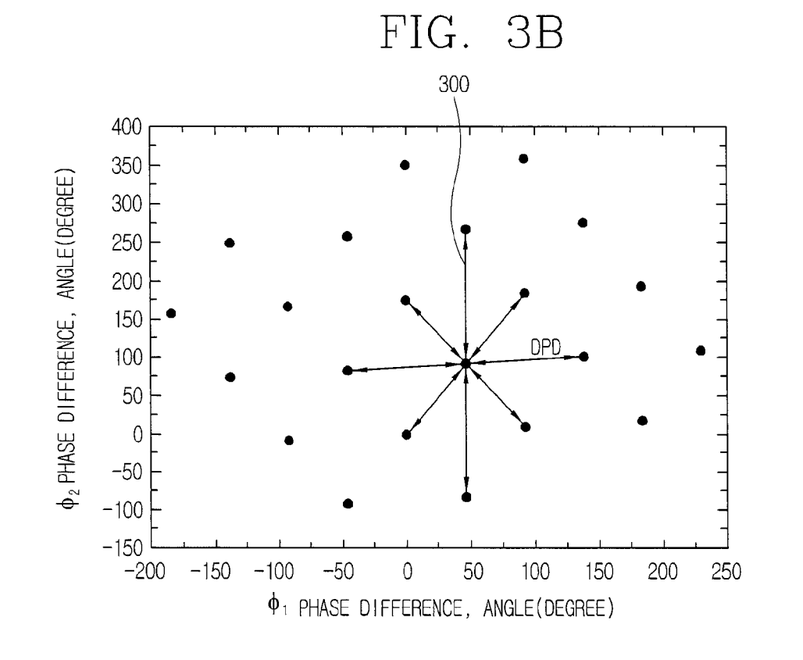
FIG. 3B is a view showing phase differences obtained by executing linear transformation for three phase difference outputs in a four-element linear array.
Figure 4:
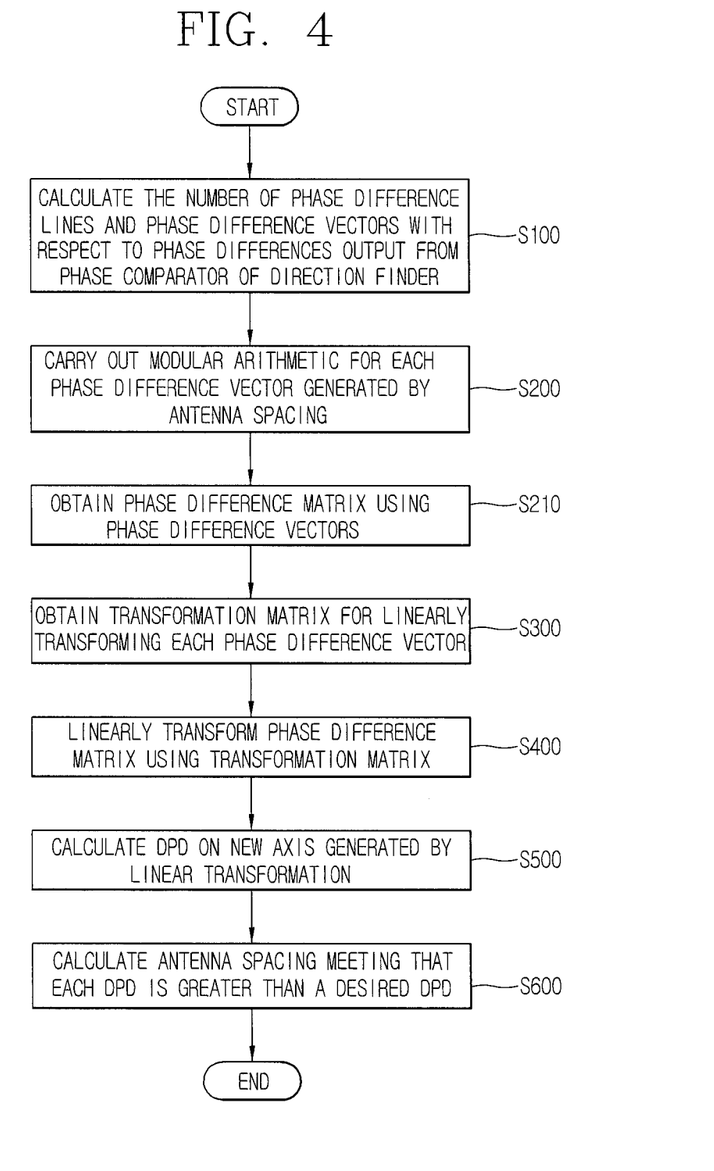
FIG. 4 is a flowchart showing a method for calculating a spacing ratio of an interferometer array antenna for a direction finder in accordance with the present disclosure.

Axis transformation for the phase difference matrix sampled in the four-element antenna array may be carried out to generate various phase difference lines as shown in FIG. 3A. The linearly transformed matrix V may be as shown in FIG. 3B. FIG. 3B is a view showing a phase difference projected onto a $(\phi_1', \phi_2')$ plane after the linear transformation. A line may be projected in form of dot. Therefore, a distance between dots generated as the phase differences on the $(\phi_1', \phi_2')$ plane, as the same as the three-element antenna array, may indicate an ambiguity spacing. The phase difference corresponding to $\phi_2'$ axis indicates the phase difference resolution of the direction finder. Accordingly, it can be noticed that the third column vector on the matrix V of Mathematical Equation 9 is not associated with ambiguity. Therefore, when a value more than a predetermined value is selected as a distance between dots represented by the first and second column vectors of the matrix V, the interferometer direction finder using the four-element array may not generate ambiguity.

The sixth step S500 may be a step of obtaining a distance between phase differences (DPD) on a new axis generated by the linear transformation.

As shown in FIG. 2C and FIG. 3B, a distance 200 between phase difference lines on the new axis by the linear transformation is the DPD in the three-element array, while a distance 300 between the phase difference dots on the new axis by the linear transformation is the DPD in the four-element array. Each DPD may be represented by Mathematical Equation 11.

$$d_{i,j,l} = \sqrt{\sum_{k=1}^{l} (v_{ki} - v_{kj})^2} \quad \text{[Mathematical Equation 11]}$$

$$i, j = 1, 2, \ldots 2K,$$

$$K = \begin{cases} K_1 + K_2 + 1, & \text{if } l = 1 \\ K_1 + K_2 + K_3 + 1, & \text{if } l = 2 \end{cases},$$

Here, when l is 1, it is the three-element array, and when l is 2, it is the four-element array.

The seventh step S600 may be a step of calculating an antenna spacing which meets that each DPD has a value greater than a desired DPD R. This may be represented by Mathematical Equation 12. That is, the DPD which meets the following Mathematical Equation 12 may be calculated as the antenna spacing between elements of an array antenna.

$$\text{All } d_{i,j,l} \geq R \quad \text{[Mathematical Equation 12]}$$
$$\underset{i \neq j}{i,j}$$

Eventually, the method of calculating the spacing ratio for the interferometer array antenna may be completed.

Table 1 shows the array spacing for each of the interferometer array antennas of the three-element type and the four-element type, calculated by the method of calculating spacing ratio for the interferometer array antenna for the direction finder according to the present disclosure.

TABLE 1

| Three-element array $0.5\lambda \leq d_1 \leq 1\lambda$(step: $0.1\lambda$) $2\lambda \leq d_2 \leq 4\lambda$(step: $0.1\lambda$) | | | Four-element array $0.5\lambda \leq d_1 \leq 1\lambda$(step: $0.1\lambda$) $1\lambda \leq d_2 \leq 3\lambda$(step: $0.5\lambda$) $2\lambda \leq d_3 \leq 5\lambda$(step: $0.5\lambda$) | | | |
|---|---|---|---|---|---|---|
| $d_1$ | $d_2$ | R: 40[degree] | $d_1$ | $d_2$ | $d_3$ | R: 80[degree] |
| 0.5 | 2.9 | 48.9 | 0.7 | 1.0 | 2.5 | 91.5 |
| 0.6 | 2.1 | 49.4 | 0.7 | 1.0 | 3.5 | 88.5 |
| 0.7 | 2.4 | 43.2 | 0.7 | 1.0 | 4.5 | 89.4 |
| 0.7 | 2.5 | 41.6 | 0.8 | 1.5 | 2.0 | 88.9 |
| 0.8 | 2.0 | 66.8 | 0.8 | 2.0 | 2.5 | 103.5 |
| 0.8 | 2.1 | 48.0 | 0.8 | 2.0 | 4.5 | 85.7 |
| 0.8 | 2.8 | 49.4 | 0.8 | 2.5 | 3.0 | 92.5 |
| 0.9 | 2.1 | 47.2 | 0.8 | 3.0 | 3.5 | 87.4 |
| 0.9 | 2.2 | 60.5 | 0.9 | 1.5 | 2.0 | 123.4 |
| 0.9 | 2.3 | 58.3 | 0.9 | 1.5 | 3.5 | 96.5 |
| 0.9 | 2.4 | 42.1 | 0.9 | 2.0 | 2.5 | 112.5 |
| 0.9 | 3.1 | 44.6 | 0.9 | 2.0 | 3.5 | 89.3 |
| 0.9 | 3.2 | 43.3 | 0.9 | 2.5 | 3.0 | 106.3 |
| 1.0 | 2.3 | 43.0 | 0.9 | 3.0 | 3.5 | 104.8 |

When the maximum value $\theta_{max}$ of a field of view is $\pi/2$, the DPD R may be 40 [degree] for the interferometer direction finder using the three-element array. When the spacing ratio is calculated according to the present disclosure, an antenna spacing which meets the calculated value may be noticed on the left of Table 1.

For the three-element array antenna, the spacing ratio between antenna elements may be understood as follows. That is, when a spacing d1 between a first antenna element and a second antenna element is 0.5 times greater than a wavelength corresponding to a center frequency radiated via an antenna and a spacing d2 between a second antenna element and a third antenna element is 2.9 times greater than a wavelength corresponding to a center frequency radiated via an antenna, the DPD R may be 48.9[degree]. Therefore, it may be a satisfactory spacing ratio between the antenna elements.

Also, for the interferometer direction finder using the four-element array, the DPD R is 80 [degree]. When a spacing ratio is calculated according to the present disclosure, a distance between antenna elements which meets the calculated value may be represented on the right of Table 1.

Here, d1, d2 and d3 may correspond to a distance between the first antenna element and the second antenna element, a distance between the second antenna element and the third antenna element and a distance between the third antenna element and the first antenna element, respectively.

The foregoing embodiments and advantages of the method for calculating a spacing ratio of the interferometer array antenna for finding direction are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for calculating a spacing between antenna elements of an interferometer array antenna, the method comprising:
setting an azimuth of an instantaneous field of view (IFOV) and a distance between phase differences with respect to signals received via the array antenna, and obtaining the number of phase difference lines and phase difference vectors with respect to the phase differences of the signals output in a phase comparator of a direction finder;
performing a modular arithmetic for the phase difference vectors to obtain phase difference matrixes;
obtaining a transformation matrix for linearly transforming the phase difference matrixes and performing the linear transformation using the transformation matrix;
calculating a distance between the phase differences on a new axis generated by the linear transformation; and
calculating an antenna spacing as an array spacing of the array antenna, the antenna spacing meeting that the distance between the phase differences is greater than a desired distance between phase differences.

2. The method of claim 1, wherein two phase differences output from the phase comparator are used when the array antenna uses a three-element linear array, and three phase differences are used when the array antenna uses a four-element linear array.

3. The method of claim 2, wherein $K_n$ is calculated using Mathematical Equation $$K_n = \text{fix}\left\{\frac{d_n}{\lambda}\sin(\theta)\right\},$$

and the phase difference vector is a multiple of $2\pi$.

4. The method of claim 3, wherein the azimuth of the IFOV is set within $-\theta_{max} \leq \theta \leq \theta_{max}$.

5. The method of claim 1, wherein the modular arithmetic $(\cdot) \bmod 2\pi$ is carried out in the three-element array when the IFOV is within $0^+ \leq \theta \leq \theta_{max}$ and the modular arithmetic $2\pi - (\cdot) \bmod 2\pi$ is carried out in the four-element array when the IFOV is within $-\theta_{max} \leq \theta \leq 0^-$.

6. The method of claim 1, wherein the linear transformation uses Mathematical Equation $V=T\Phi$ in the three-element array.

7. The method of claim 6, wherein the transformation matrix is $$T = \begin{bmatrix} \cos(\alpha) & -\sin(\alpha) \\ \sin(\alpha) & \cos(\alpha) \end{bmatrix},$$

where $\alpha$ meets $\alpha = \tan^{-1}(d_1/d_2)$.

8. The method of claim 1, wherein the linear transformation uses $V=T_{\phi_2}T_{\phi_1}\Phi$ in the four-element array.

9. The method of claim 8, wherein the transformation matrix is $$T_{\phi_1} = \begin{bmatrix} \cos(\alpha) & \sin(\alpha) & 0 \\ -\sin(\alpha) & \cos(\alpha) & 0 \\ 0 & 0 & 1 \end{bmatrix},$$

and $$T_{\phi_2} = \begin{bmatrix} 1 & 0 & 0 \\ 0 & \cos(\beta) & \sin(\beta) \\ 0 & -\sin(\beta) & \cos(\beta) \end{bmatrix},$$

where $\alpha$ and $\beta$ meet $\alpha = -\tan^{-1}(d_1/d_2)$, and $\beta = -\tan^{-1}(\sqrt{d_1^2+d_2^2}/d_3)$, respectively.

10. The method of claim 1, wherein the distance between the phase differences is obtained by using $$d_{i,j,l} = \sqrt{\sum_{k=1}^{l}(v_{ki}-v_{kj})^2}$$

$i, j = 1, 2, \ldots 2K,$ $$K = \begin{cases} K_1 + K_2 + 1, & \text{if } l = 1 \\ K_1 + K_2 + K_3 + 1, & \text{if } l = 2 \end{cases}.$$

11. The method of claim 1, wherein Mathematical Equation $$\text{All}_{\substack{i,j \\ i \neq j}} d_{i,j,l} \geq R$$

is used to meet that each distance between the phase differences is greater than a desired distance between phase differences.

* * * * *